United States Patent
Hawes et al.

(10) Patent No.: US 7,798,276 B2
(45) Date of Patent: Sep. 21, 2010

(54) VEHICLE PEDESTRIAN IMPACT SENSOR WITH PROXIMITY ARMING

(75) Inventors: Kevin J. Hawes, Greentown, IN (US); William W. Fultz, Carmel, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/467,721

(22) Filed: May 18, 2009

(65) Prior Publication Data

US 2009/0218159 A1 Sep. 3, 2009

Related U.S. Application Data

(62) Division of application No. 11/073,438, filed on Mar. 7, 2005, now Pat. No. 7,552,792.

(51) Int. Cl.
*B60K 28/10* (2006.01)

(52) U.S. Cl. ..................................................... 180/274

(58) Field of Classification Search .................. 180/274, 180/271; 280/735
See application file for complete search history.

(56) References Cited

U.S. PATENT DOCUMENTS

| 7,488,015 B2 * | 2/2009 | Lu et al. ...................... 293/117 |
| 2006/0064220 A1 * | 3/2006 | Murakami et al. ............ 701/45 |
| 2007/0157700 A1 * | 7/2007 | Dukart ....................... 73/12.09 |

\* cited by examiner

*Primary Examiner*—Faye M. Fleming
(74) *Attorney, Agent, or Firm*—Thomas N. Twomey

(57) ABSTRACT

A pedestrian impact sensor system includes a first plate and a second plate both connected to an outer surface of a vehicle such that a capacitance between the first plate and the second plate is dependent upon whether a body proximate the vehicle is animate. A crush sensor senses a force exerted by the body on the vehicle. A monitoring circuit monitors the capacitance between the first plate and the second plate and an output signal of the crush sensor. The monitoring circuit issues a safety countermeasure signal dependent upon the capacitance between the first plate and the second plate and the output signal of the crush sensor.

8 Claims, 6 Drawing Sheets

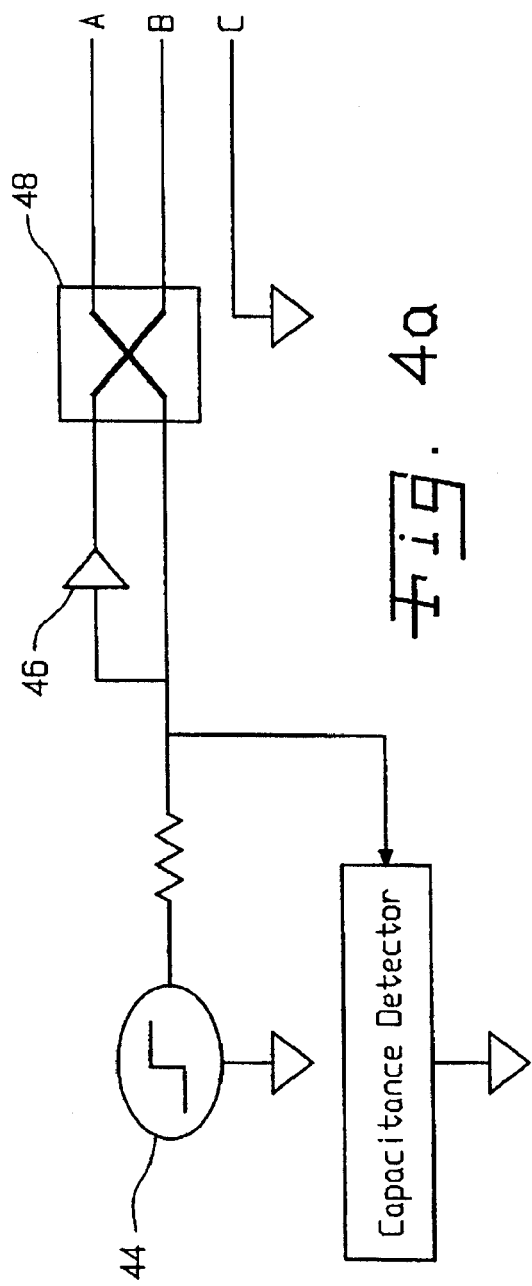
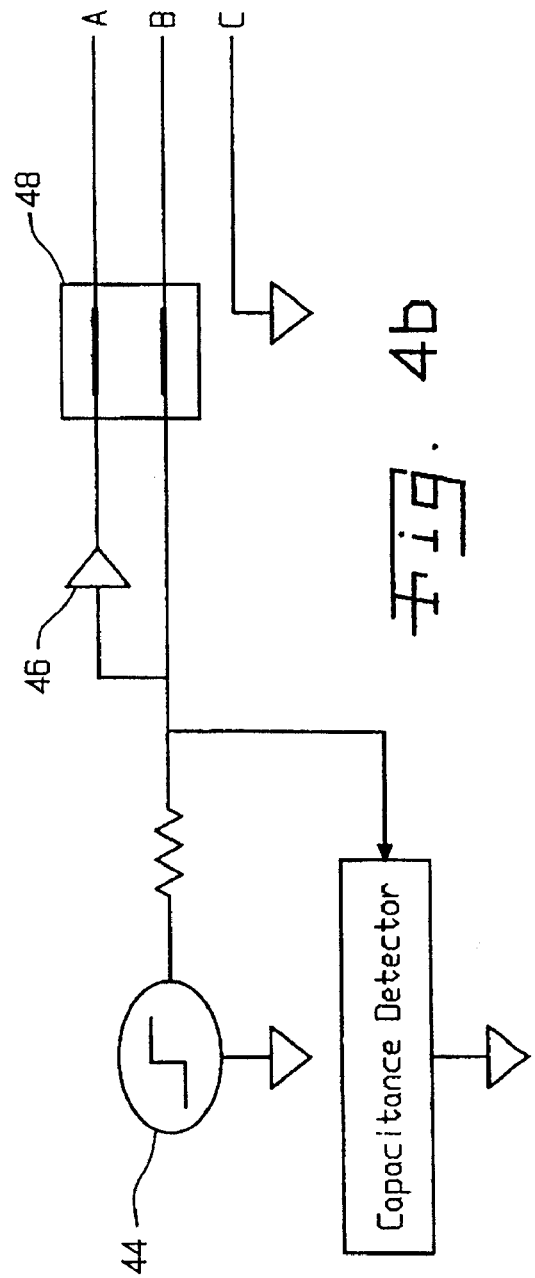
Fig. 4a
Fig. 4b

VEHICLE PEDESTRIAN IMPACT SENSOR WITH PROXIMITY ARMING

CROSS REFERENCE TO RELATED APPLICATIONS

The present application is a divisional application of U.S. patent application Ser. No. 11/073,438 filed on Mar. 7, 2005.

TECHNICAL BACKGROUND

The present invention relates to a crush sensor, and, more particularly, to a crush sensor for use in a vehicle to sense a pedestrian.

BACKGROUND OF THE INVENTION

Vehicles are known to include safety countermeasure devices that may be deployed in the event of a collision with a pedestrian. These safety countermeasure devices may include a sensor for detecting a collision with an object. The sensor may discriminate between pedestrians and other objects such as balls and rocks, which are sometimes referred to as "immunity impacts". More particularly, the sensor may detect when a soft bodied object, such as part of a live creature, e.g., a human leg, collides with a front bumper of the vehicle.

A problem is that such sensor systems are expensive, particularly when configured to be able to detect a collision anywhere across the front bumper. Another problem is that first surface sensors such as piezo film sensors do not adequately discriminate between small objects such as rocks and larger objects such as pedestrians. Slightly burying the sensor in the bumper structure improves sensor discrimination by allowing the bumper structure to filter the force of light objects (abuse) from the force of larger targets such as the human leg.

What is needed in the art is a low cost sensor system for detecting collision between a pedestrian and a front bumper of a vehicle, wherein the system is capable of discriminating between a pedestrian and a smaller object, and between a pedestrian and an inanimate object that is of similar size and shape as a pedestrian.

SUMMARY OF THE INVENTION

The present invention provides a capacitance-based, pedestrian impact sensor system that may discriminate between a human leg and inanimate objects. The sensor system is configured to enable capacitive crush sensing as well as capacitive proximity sensing of the region in front of the front bumper of the vehicle in order to verify that the object causing the crushing is likely a human leg. Thus, the sensor system may prevent deployment of safety countermeasures in situations in which they would not be appropriate, such as in a collision with a post. A crush sensor includes conductive plates which provide a variable capacitance depending upon the load present across the structure of the front bumper.

The invention comprises, in one form thereof, a pedestrian impact sensor system including a first plate and a second plate. Both plates are connected to an outer surface of a vehicle such that a capacitance between the first plate and the second plate is dependent upon whether a body proximate the vehicle is animate. A crush sensor senses a force exerted by the body on the vehicle. A monitoring circuit monitors the capacitance between the first plate and the second plate and an output signal of the crush sensor. The monitoring circuit issues a safety countermeasure signal dependent upon the capacitance between the first plate and the second plate and the output signal of the crush sensor.

The invention comprises, in another form thereof, a vehicular safety countermeasure deployment method, including ascertaining whether an external body proximate a vehicle is animate, determining whether a force exerted on the vehicle by the external body has a magnitude exceeding a threshold magnitude and/or a time rate of change exceeding a threshold time rate of change, and deploying a safety countermeasure dependent upon the detecting and determining steps.

An advantage of the present invention is that the sensor system is less expensive than other known sensor systems.

Another advantage is that the sensor system may discriminate between a soft bodied, electrically conductive object, e.g., a human leg, and other smaller inanimate objects.

Yet another advantage is that the sensor system may discriminate between a human leg and inanimate objects of a similar size and shape, such as a post.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 4a is a block diagram of another embodiment of a pedestrian impact sensor system of the present invention.

FIG. 4b is a block diagram of the pedestrian impact sensor system of FIG. 4a with the multiplex box in another position.

Figure 1:
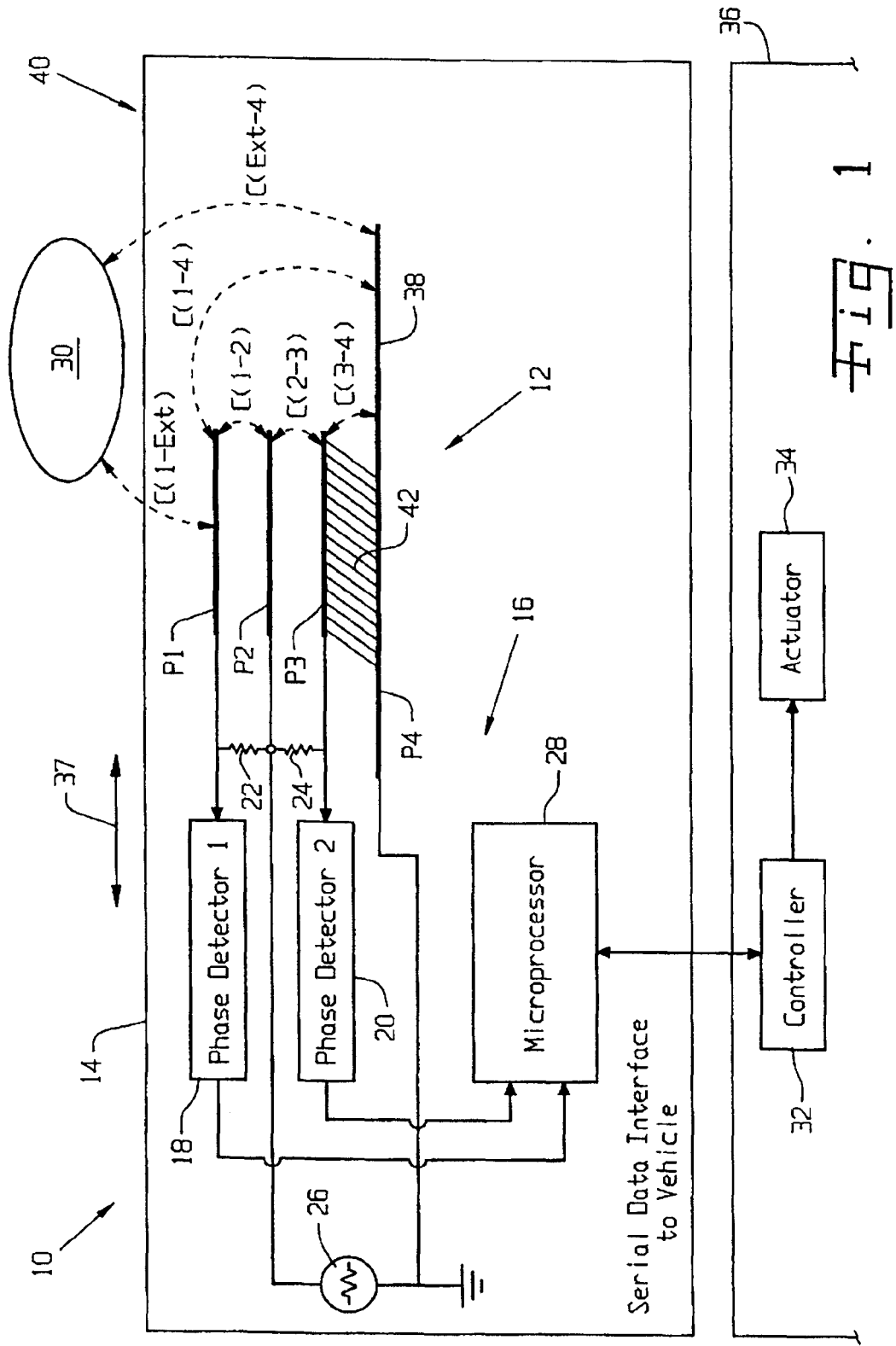
FIG. 1 is a block diagram of one embodiment of a pedestrian impact sensor system of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Referring now to the drawings, and more particularly to FIG. 1, there is shown one embodiment of a pedestrian impact sensor system 10 of the present invention including a pedestrian impact sensing arrangement 12 connected to a front bumper 14. Arrangement 12 includes conductive plates P1, P2, P3 and P4, and a capacitance monitoring circuit 16. Circuit 16 includes a first phase detector or capacitance measuring circuit 18, a second phase detector or capacitance measuring circuit 20, resistors 22, 24, an AC voltage source 26, and a microprocessor 28.

Plates P1, P2, P3 and P4 may be parallel to each other and may provide measurable capacitances therebetween. In one embodiment, plates P1, P2, P3 are each three inch by three inch squares of copper foil. Alternatively, plates P1, P2, P3 may be constructed of any conductive material. As shown, plate P2 may be disposed between plates P1 and P3, and plate P3 may be disposed between plates P2 and P4.

Plates P3 and P4 form a crushable capacitor C(3-4) or "crush sensor" which may be mounted on bumper 12. More particularly, plate P4 may be mounted on or integrally formed with bumper 14. It is also possible for bumper 14 to function as plate P4 without any separate structure. Plate P4 may be electrically connected to chassis ground, as illustrated. When crushed, i.e., when plate P3 is moved closer to plate P4, the capacitance of C(3-4) changes. Capacitance monitoring circuit 16 may determine the rate of crush of capacitor C(3-4) by measuring the time rate of change of the capacitance of capacitor C(3-4). If this time rate of capacitance change is great enough, i.e., exceeds a threshold level, and the level of capacitance between plates P1 and P4 indicates just prior to impact that an external body 30 is a human or other animal, then microprocessor 28 may transmit a safety countermeasure signal indicative thereof to vehicle controller 32. Controller 32 may then transmit a signal to actuator 34, causing actuator 34 to initiate some safety countermeasure, such as unlatching a vehicle hood 36 in order to soften the landing of the person or animal on hood 36. The relative velocity between the vehicle and external body 30 may also be determined from the rate of crush.

As shown, plate P4 extends farther than plate P1 in lateral directions 37. However, Plate P4 may also, or alternatively, extend farther than plate P1 in a predominantly upward and/or in a predominantly downward direction out of and/or into the page of FIG. 1. Thus, when bumper 14 collides with external body 30, body 30 is likely to physically engage both of plates P1 and P4. Both of plates P1 and P4 are connected to an outer surface 38 of front bumper 14 of a vehicle 40 such that a capacitance between plate P1 and plate P4 is dependent upon whether the body 30 proximate vehicle 40 is animate.

A proximity sensing circuit, including plate P1 for sensing capacitance of C(1-Ext), may be used to protect or "safe" the system from deploying a safety countermeasure when not needed, such as when a rock or other inanimate object collides with bumper 14. The inanimate object may generate a level of capacitance C(1-4) that is below a calibrated minimum capacitance or above a calibrated maximum capacitance that is indicative of a human leg. A leg is formed primarily of water, which has a high dielectric constant K. Thus, a leg produces a higher C(1-4) than does a dielectric material with a lower dielectric constant, such as air, wood or brick, for example. Although C(1-4) is an indeterminate capacitance value, it may be typical for capacitance C(1-4) to be about 80 times greater with a human leg dielectric than with an air dielectric. The dielectric constant of wood (poles/posts) is 1.2 to 2.1; of ice is 3.2; of brick is 4.2; and of concrete block is 2.2. Thus, by monitoring the capacitance of C(1-4), system 10 may discern a human leg from an inanimate object. In one embodiment, microprocessor 28 may monitor capacitance C(1-4) for a threshold change per unit time, and, if such threshold change occurs, microprocessor 28 may begin or "arm" the monitoring of capacitance C(3-4).

In one embodiment, voltage source 26 applies a voltage of less than 12 VAC, such as approximately between 3 and 5 VAC, to each of plates P1, P2 and P3. In general, the higher the peak-to-peak voltage applied to plates P1, P2 and P3, the longer the distance between external body 30 and plate P1 at which body 30 may be detected. Alternate capacitance measurement systems can also be employed with this sensor structure.

Voltage source 26 may apply voltage directly to plate P2 to thereby use plate P2 as a driven backplane. Thus enabled is unidirectional capacitance measuring between plates P1 and P4 forward of the vehicle and through body 30, i.e., the series combination of C(1-Ext) and C(Ext-4). Further enabled is unidirectional capacitance measuring between plates P3 and P4, i.e., C(3-4). The capacitance between plates P1 and P2 as well as the capacitance between plates P2 and P3 have a minor impedance effect on the desired sensing of C(1-Ext) or C(3-4) because the net voltage across plates P1, P2 and plates P2, P3 is nearly zero. This may be explained by the capacitive current equation: I=C(dV/dt). Because voltage is essentially zero, the capacitive current is essentially zero between plates P1, P2 as well as between plates P2, P3. The small fringing effects from plate P1 to plate P3, or from plate P1 to plate P4 may be further reduced by increasing the surface area of plate P2, i.e., the driven element, such that the edges of plate P2 extend outward farther than the edges of plates P1 and P3.

Sensing of external capacitance C(1-ext) and of C(3-4) may be accomplished by excitation of source sine wave generator 26 at an approximate frequency of 125 kHz. The excitation energizes backplane plate P2 and excites plate P1 via resistor 22 and excites plate P3 via resistor 24. The resistances of resistors 22, 24 may be approximately equal to the impedances of C(1-2) and C(2-3), respectively, while at steady state conditions and with no collision occurring. For example, resistors 22, 24 may each have a resistance of approximately 26K ohm for typical plate sizes. The impedance between plates P3, P4 may be approximately 30K ohm in one embodiment.

First phase detector 18 may detect a phase shift in C(1-4) due to external object 30 and may transmit a signal indicative thereof to microprocessor 28. In one embodiment, C(1-4) is approximately between 10 pF and 60 pF. Microprocessor 28 may include memory for storing calibration values for capacitance and/or phase shift for the steady state condition. These calibration values may include threshold values for valid external capacitance levels for a human leg as needed for safing of system 10.

Plate P1 and first phase detector 18 may function as a proximity sensor which may discriminate between a leg that is exerting force on plate P1 and a leg that is merely close to plate P1. The phase associated with plate P1 is dependent upon the impedance between plates P1 and P4, which is dependent upon C(1-Ext) and C(Ext-4) according to the following equation, wherein s designates radians:

$$\text{Impedance}_{P1-P4}=(1/C(1\text{-Ext})s)+(1/C(\text{Ext-}4)s).$$

As a leg gets close to plate P1, C(1-Ext) may increase from approximately 10 pF to approximately 100 pF. However, there may be no significant change in C(Ext-4) as the leg gets close to plate P1. The net effect is some reduction in the impedance between plates P1, P4. Conversely, when a leg touches or presses upon plate P1, both C(1-Ext) and C(Ext-4) are maximized, thereby minimizing the impedance between plates P1, P4.

Second phase detector 20 may detect a phase shift due to a change in C(3-4) which may result from a crushing of material 42 between plates P3, P4. That is, second phase detector 20 may monitor the output signal of the crush sensor. Second phase detector 20 may transmit a signal indicative of the detected phase shift to microprocessor 28. In one embodiment, C(3-4) is approximately between 5 pf and 100 pF. Memory associated with microprocessor 28 may store calibration values for capacitance and/or phase shift for the steady state condition. These calibration values may include threshold values for valid rates of change of the C(3-4) capacitance levels for a human leg with respect to time.

A leg pressing plates P3 and P4 together causes a corresponding increase in capacitance C(3-4) according to the equation $$C = \epsilon_0 K (\text{Area})/d,$$

wherein d is the distance between plates. Thus, a four-fold increase in measured capacitance, such as from 15 pF to 60 pF, may indicate that the distance between plates P3 and P4 has been reduced by 75%.

The signal from first phase detector 18 may indicate whether a collision with an external object 30 has occurred. The signal from second phase detector 20 may indicate whether object 30 is possibly human. Microprocessor 28 may consider both the output signal from first phase detector 18 and the output signal from second phase detector 20 in deciding whether to initiate a safety countermeasure by issuing a safety countermeasure signal to controller 32.

Microprocessor 28 may also perform diagnostics of both external capacitance C(1-4) and crush capacitance C(3-4) as a start-up procedure. A warning signal may be transmitted to the driver if one or both of these diagnostic capacitances are not within calibration limits. Microprocessor 28 may also perform crash data logging in the event of a detectable collision.

Plates P1, P2 and P3 may be formed of a multi-layer, flexible material. Plates P1, P2 and P3 may be included in a laminated flex circuit that is bonded to plate P4. Plate P4 may be incorporated into material 42. It is also possible to use a crushable fluid-filled bladder in place of material 42. The bladder may be filled with air or silicone, for example. The thicknesses of the layer between plates P1, P2 and the layer between plates P2, P3 may both be approximately 0.2 inch. The thicknesses of the layer between plates P3 and P4 may be greater than approximately one-eighth inch. In one embodiment, the thicknesses of the layer between plates P3 and P4 may be approximately 0.5 inch.

In another embodiment, the distance between plates P1, P2 is approximately 0.75 micron, and this gap between plates P1, P2 is filled with an electrically non-conductive polyester laminate dielectric material. The gap between plates P2, P3 may have the same dimensions and may be filled with the same material. The distance between plates P3 and P4 may be approximately 10 millimeters. This gap between plates P3 and P4 may be filled predominantly with air, but also with foam injected between plates P3, P4. In this embodiment, capacitance C(3-4) may be approximately 5 pF.

Again, due to the voltage isolation of driven plate P2, the capacitance of C(1-2) and C(2-3) may have minor effect on external capacitance C(1-4) and crush capacitance C(3-4) measurements. Thus, a manufacturing advantage of the present invention is that the thicknesses of the layer between plates P1, P2 and the layer between plates P2, P3 are not critical and do not need to be held within tight tolerances.

The sensing substrate formed by plates P1, P2, P3, P4 may be in the form of one continuous strip extending across the outer surface of bumper 14. Alternatively, system 10 may monitor only one relatively small zone on bumper 14, with a number of systems being spaced apart across bumper 14.

An advantage of this technology over a piezo sensor technology is the constant signal independent of time. Piezo sensors typically provide only transient (alternating current) signals which do not lend themselves to slow impacts due to settling out of the signal. Likewise, diagnostics are also difficult due to this AC nature of the signal. By use of capacitive proximity and crush sensing, true continuous parameter measurements can be performed including diagnostics of objects continually placed near the sensor as well as constant forces applied.

In another embodiment, bumper 14 is in the form of a rear bumper, and system 10 may be used for object detection. A warning signal may be transmitted to the driver if an object is sensed. Alternatively, the sensing arrangement of the present invention may be applied to a side surface of a vehicle, such as a molding strip of a door, to thereby sense a side collision.

The present invention has been described herein as detecting the phase of the AC voltage signal. However, it is to be understood that it is alternatively possible to analyze the transient pulse and capacitance of the external impedance.

Figure 2A:
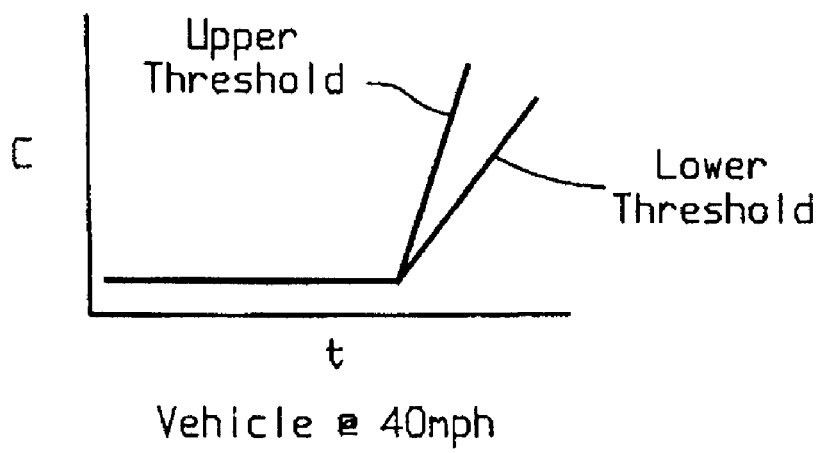
FIG. 2a is a plot of the upper and lower threshold capacitance of the proximity sensor as a function of time at a vehicle speed of 40 mph.
Figure 2B:
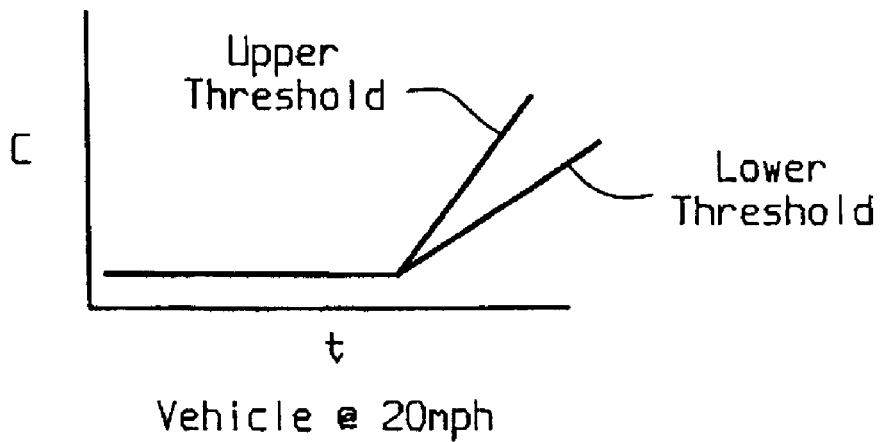
FIG. 2b is a plot of the upper and lower threshold capacitance of the proximity sensor as a function of time at a vehicle speed of 20 mph.
Figure 3A:
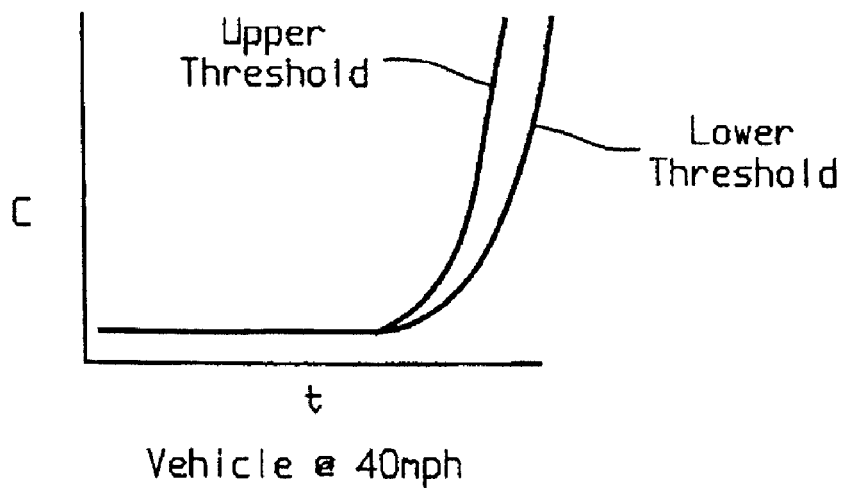
FIG. 3a is a plot of the upper and lower threshold capacitance of the crush sensor as a function of time at a vehicle speed of 40 mph.
Figure 3B:
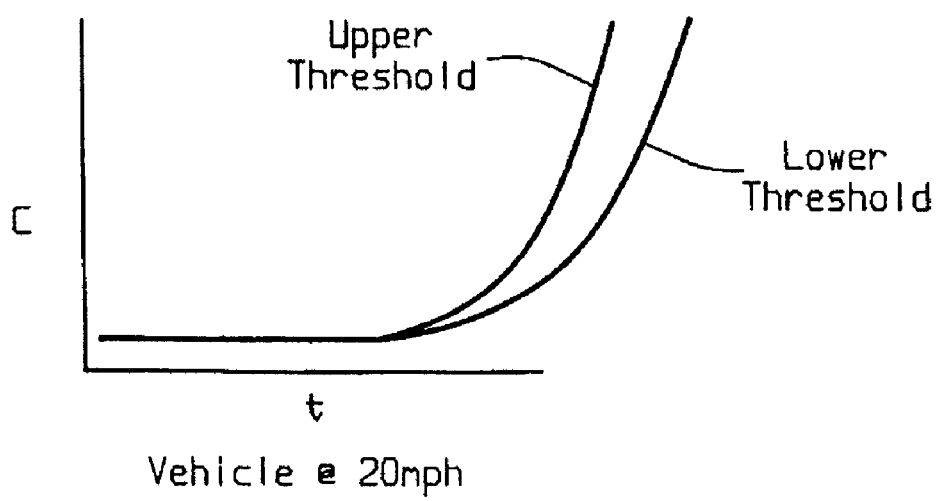
FIG. 3b is a plot of the upper and lower threshold capacitance of the crush sensor as a function of time at a vehicle speed of 20 mph.

In other embodiments, instead of measuring the magnitude of the capacitance to determine whether it exceeds a threshold capacitance, the time rate of change of the capacitance is measured to determine whether it exceeds a threshold time rate of change. FIGS. 2a and 2b illustrate a vehicle speed dependent window for proximity capacitance change vs. time, and FIGS. 3a and 3b illustrate a vehicle speed dependent window for crush capacitance change vs. time. More particularly, FIG. 2a plots the upper and lower threshold time rates of change of C(1-4) when the vehicle is travelling at 40 miles per hour (mph) and approaches or collides with a pedestrian. If the time rate of change of the capacitance greater than the lower threshold time rate of change, then it may be determined that the object collided with is animate. In another embodiment, the time rate of change of the capacitance must also be less than the upper threshold time rate of change for it to be determined that the object collided with is animate. It is assumed that the animate object is moving relatively slowly verses the vehicle, such as less than 5 mph.

The capacitance slope window for an animate object is dynamic with vehicle speed. FIG. 2b plots the upper and lower threshold time rates of change of C(1-4) when the vehicle is travelling at 20 miles per hour (mph) and approaches or collides with an animate object. The threshold limits may not be linear as dictated by the closing capacitance change given by the following well known equation: $C = ekA/d$ Similarly, FIGS. 3a and 3b plot the upper and lower threshold time rates of change of C(3-4) when the vehicle is travelling at 40 mph and 20 mph, respectively, and collides with an object as heavy as a pedestrian. If the time rate of change of the capacitance is greater than the lower threshold time rate of change, then it may be determined that the object collided with has a weight roughly equivalent to that of a pedestrian. In another embodiment, the time rate of change of the capacitance must also be less than the upper threshold time rate of change for it to be determined that the object collided with has a weight roughly equivalent to that of a pedestrian. Because the capacitance is a proxy for the force exerted on the vehicle by the object collided with, the magnitude or time rate of change of the capacitance is equivalent to the magnitude or time rate of change of the force exerted on the vehicle by the object collided with, and may be used as such within the scope of the present invention.

These algorithms improve the discrimination of the detected object by dynamically tailoring the sensing system to better recognize the variation in capacitance change of a stationary or slowly moving pedestrian between a fast approaching vehicle and a medium approaching vehicle. The fast approaching vehicle will have a quicker increase in the capacitance per unit time than the medium velocity vehicle. Hence the algorithms will adjust their window thresholds based on vehicle velocity in the detection of a pedestrian. It is possible that both proximity and crush sensing will use an exponential upper and lower threshold limit curve for decision making.

In another embodiment, illustrated in FIGS. 4a and 4b, the number of plates employed is reduced from four to three via the use of time multiplexing. More particularly, in FIG. 4a is shown a front plate A which is analogous to plate P1, a middle plate B, and a rear plate C which is analogous to plate P4.

While in the proximity sensing mode, plate A may be driven by a current or voltage source 44, and plate B may be driven by a voltage follower circuit 46 coupled to source 44 such that plate B follows the voltage present on plate A. In this way, plate B is a driven shield essentially isolating plate A from any capacitive effects of plate C or the bumper structure. Proximity capacitance in front of the bumper is then easily measured by the voltage change versus time for a constant current applied or for a constant voltage applied by the current ramp up rate. Alternate capacitive measurement methods may also be implemented.

While in the crush sensing mode, plate B may be driven by current or voltage source 44 and plate A may be driven by a voltage follower circuit 46 such that it follows the voltage present on plate B, as illustrated in FIG. 4b. In this way, plate A is a driven shield essentially isolating plate B from any capacitive effects from in front of the bumper. Crush capacitance between plates B and C is then easily measured by the voltage change versus time for a constant current applied or for a constant voltage applied by the current ramp up rate. Alternate capacitive measurement methods may also be implemented.

A multiplex box 48 may be coupled to both source 44 and circuit 46. When multiplex box 48 is in the position of FIG. 4a, source 44 is electrically connected to plate A and voltage follower circuit 46 is electrically connected to plate B. In contrast, when multiplex box 48 is in the position of FIG. 4b, source 44 is electrically connected to plate B and voltage follower circuit 46 is electrically connected to plate A. The monitoring system may, via multiplex box 48, alternate between proximity sensing and crush sensing at a frequency that is higher than needed to accurately discriminate an incoming object. For example, multiplex box 48 may switch between the positions of FIGS. 4a and 4b at a frequency approximately between 20 Hz and 50 kHz. An advantage of the embodiment of FIGS. 4a and 4b is the reduction of the number of plates required by the system.

Figure 5:
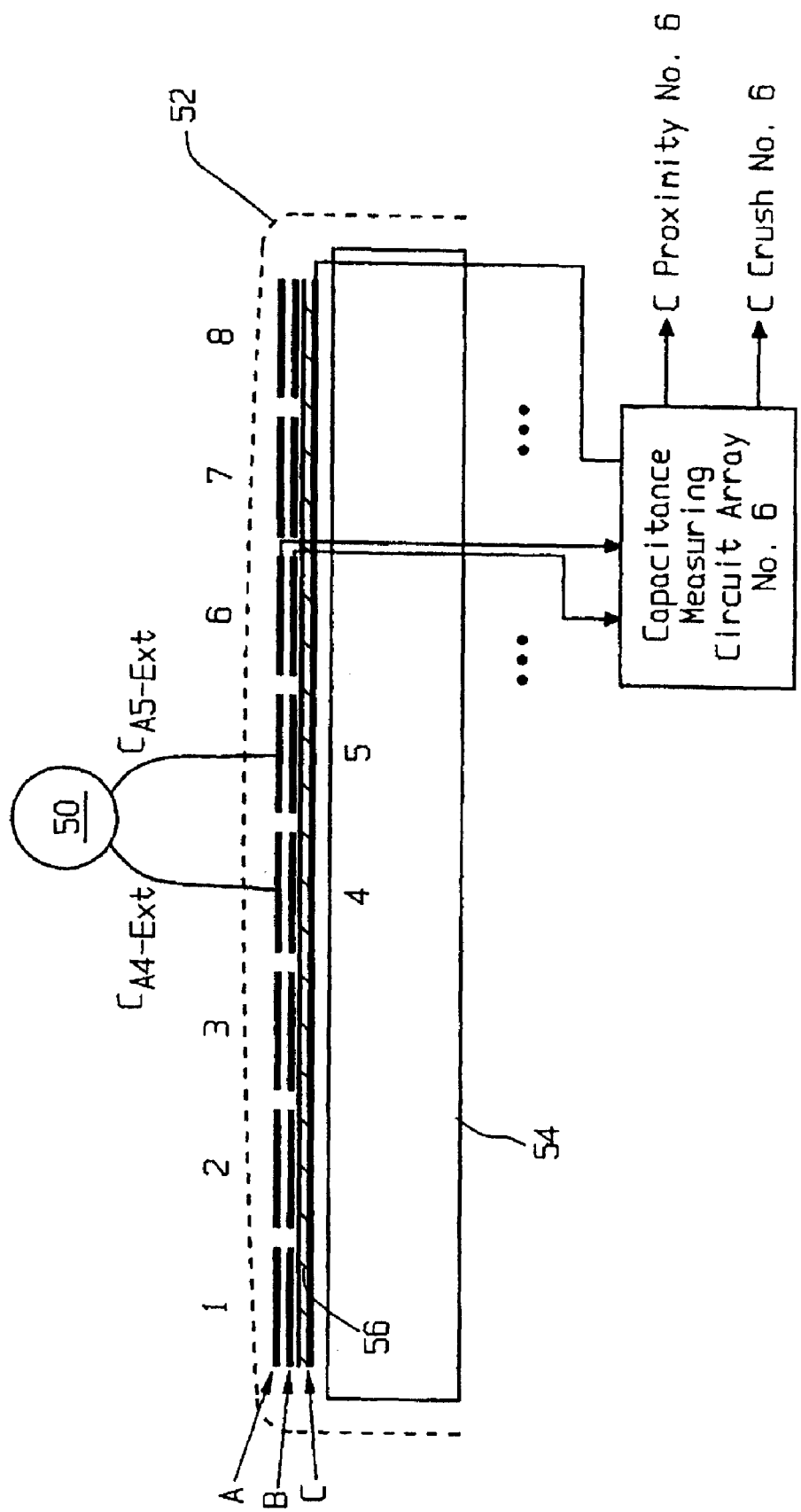
FIG. 5 is a block diagram of yet another embodiment of a pedestrian impact sensor system of the present invention.
Figure 6:
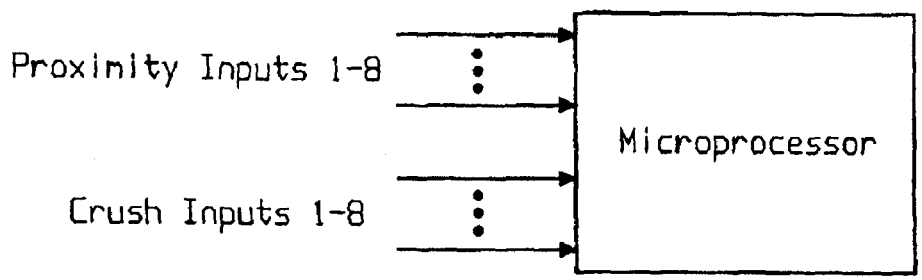
FIG. 6 is a block diagram of a microprocessor receiving the inputs of the proximity and crush sensors of the system of FIG. 5.

In another embodiment, illustrated in FIGS. 5 and 6, proximity sensing of an external object 50 may be performed from one plate A to an adjacent plate A by using series of sensors in a bumper having skin 52. The bumper may be formed of plastic and may include absorber foam 54. A layer 56 of crush medium may be provided between plates B and plate A. The inputs from all proximity sensors and all crush sensors may be received by a microprocessor, as shown in FIG. 6.

In one embodiment, sensors are sequentially activated to identify target location and proximity to the sensor array. This activation sequence may also minimize sensor-to-sensor interference.

Alternate sequencing strategies could also be employed. For example, when a target is identified, the frequency of scans in the region of interest can be increased for better resolution and faster reaction time.

Figure 7:
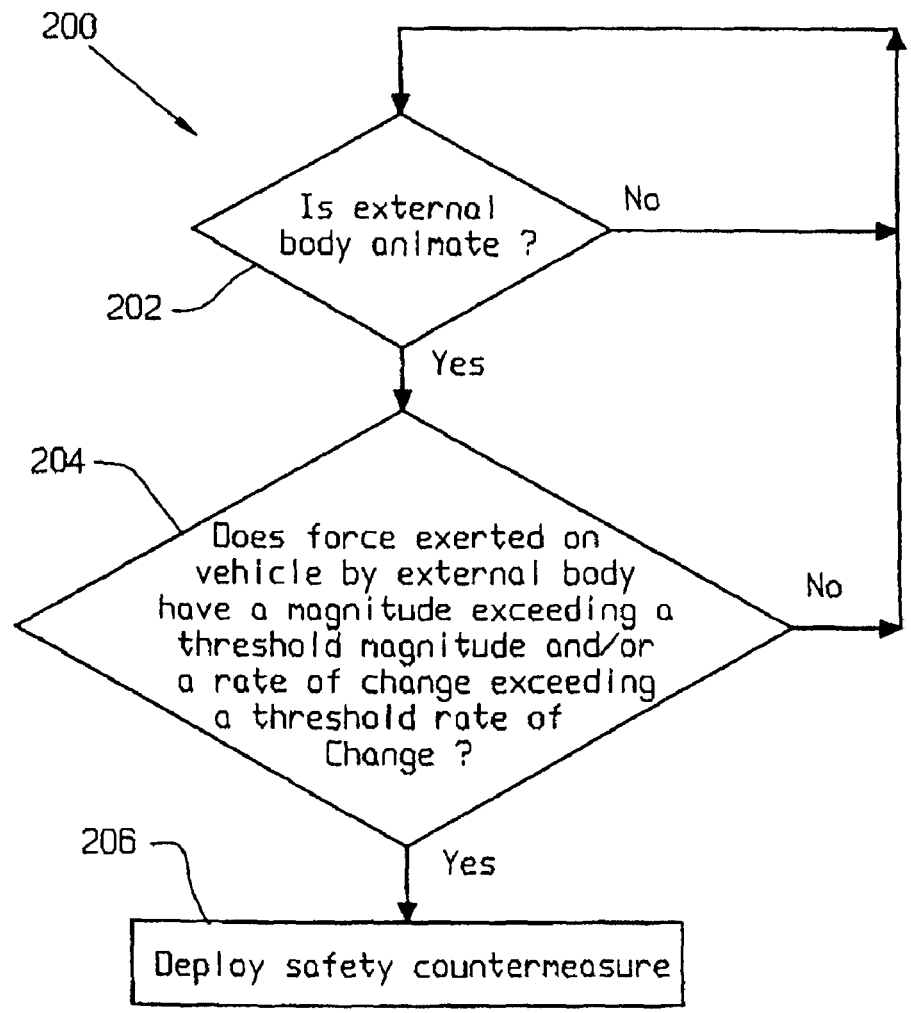
FIG. 7 is a flow chart of one embodiment of a vehicle safety countermeasure deployment method of the present invention.

FIG. 7 illustrates one embodiment of a vehicular safety countermeasure deployment method 200 of the present invention. In a first step 202 it is ascertained whether a body external to and proximate a vehicle is animate. For example, if the capacitance between plates P1 and P4 is above a threshold level, then it may be ascertained that external body 30 is animate. If the capacitance is below the threshold level, then the capacitance may be continued to be monitored to detect if the capacitance rises above the threshold level. If the capacitance is above the threshold level, then, in step 204, it is determined whether the force exerted on the vehicle by the external body has a magnitude exceeding a threshold magnitude and/or has a time rate of change exceeding a threshold time rate of change. For example, if the capacitance between plates P3 and P4 is above a threshold capacitance level, then it may be determined that plates P3 and P4 are being pushed closer together due a force that is exerted on the vehicle by external body 30 having a magnitude exceeding a threshold magnitude. Alternatively, if the capacitance between plates P3 and P4 has a time rate of change that is above a threshold level, then it may be determined that plates P3 and P4 are being pushed closer together due a force that is exerted on the vehicle by external body 30 having a time rate of change exceeding a threshold time rate of change. If neither the magnitude nor the time rate of change of the force exceeds a threshold level, then operation may return to step 202. If the magnitude or time rate of change of the force does exceed a threshold level, then, in step 206, a safety countermeasure may be deployed. For example, a hood latch may be released to soften the impact of animate body 30 on the hood of the vehicle.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicular safety countermeasure deployment method, comprising the steps of:
   ascertaining whether an external body proximate a vehicle is animate;
   determining whether a force exerted on the vehicle by the external body has at least one of,
   (i) a magnitude exceeding a threshold magnitude, and
   (ii) a time rate of change exceeding a threshold time rate of change, and
   deploying a safety countermeasure dependent upon said ascertaining and determining steps,
   wherein said ascertaining step further includes,
   providing a first plate and a second plate, both said first plate and said second plate being connected to an outer surface of the vehicle such that a capacitance between said first plate and said second plate is dependent upon whether the body proximate the vehicle is animate, and monitoring the capacitance between said first plate and said second plate, wherein said monitoring step includes, applying an AC voltage signal to said first plate, and detecting a phase of the AC voltage signal.

2. A vehicular safety countermeasure deployment method, comprising the steps of:
- ascertaining whether an external body proximate a vehicle is animate;
- determining whether a force exerted on the vehicle by the external body has at least one of,
  - (i) a magnitude exceeding a threshold magnitude,
  - (ii) a time rate of change exceeding a threshold time rate of change, and
- deploying a safety countermeasure dependent upon said ascertaining and determining steps,
- wherein said ascertaining step further includes,
  - providing a first plate and a second plate, both said first plate and said second plate being connected to an outer surface of the vehicle such that a capacitance between said first plate and said second plate is dependent upon whether the body proximate the vehicle is animate, and
  - monitoring the capacitance between said first plate and said second plate,
  - wherein said monitoring step includes, applying an AC voltage signal to said first plate; and analyzing a transient pulse and capacitance of an external impedance.

3. A vehicular safety countermeasure deployment method, comprising the steps of:
- ascertaining whether an external body proximate a vehicle is animate;
- determining whether a force exerted on the vehicle by the external body has at least one of,
  - (i) a magnitude exceeding a threshold magnitude, and
  - (ii) a time rate of change exceeding a threshold time rate of change, and
- deploying a safety countermeasure dependent upon said ascertaining and determining steps,
- wherein said determining step includes,
  - providing a crush sensor having a first plate and a second plate, a capacitance between said first plate and said second plate varying with the force exerted by the body on the vehicle,
  - applying an AC voltage signal to said first plate; and detecting a phase of the AC voltage signal.

4. A vehicular safety countermeasure deployment method, comprising the steps of:
- ascertaining whether an external body proximate a vehicle is animate;
- determining whether a force exerted on the vehicle by the external body has at least one of,
  - (i) a magnitude exceeding a threshold magnitude, and
  - (ii) a time rate of change exceeding a threshold time rate of change, and
- deploying a safety countermeasure dependent upon said ascertaining and determining steps,
- wherein said ascertaining step further includes,
  - providing a first plate and a second plate, both said first plate and said second plate being connected to an outer surface of the vehicle such that a capacitance between said first plate and said second plate is dependent upon whether the body proximate the vehicle is animate, and
  - monitoring the capacitance between said first plate and said second plate,
- wherein said determining step includes,
  - providing a crush sensor including said second plate and a third plate, and
  - monitoring a capacitance between said second plate and said third plate.

5. The method of claim 1, wherein said step of providing the first plate and the second plate further includes the outer surface being on a front bumper of the vehicle.

6. The method of claim 1, wherein said step of providing the first plate and the second plate further includes the outer surface being on a rear bumper of the vehicle, and said step of deploying the safety countermeasure further includes transmitting a warning signal to a driver.

7. The method of claim 1, wherein said step of ascertaining whether the external body proximate the vehicle is animate includes determining whether a time rate of change of the capacitance between said first plate and said second plate exceeds a threshold time rate of change of the capacitance, the threshold time rate of change of the capacitance being dependent upon a speed of the vehicle.

8. The method of claim 4, wherein the determining step further includes the threshold time rate of change being dependent upon a speed of the vehicle.

* * * * *